Figure 4:
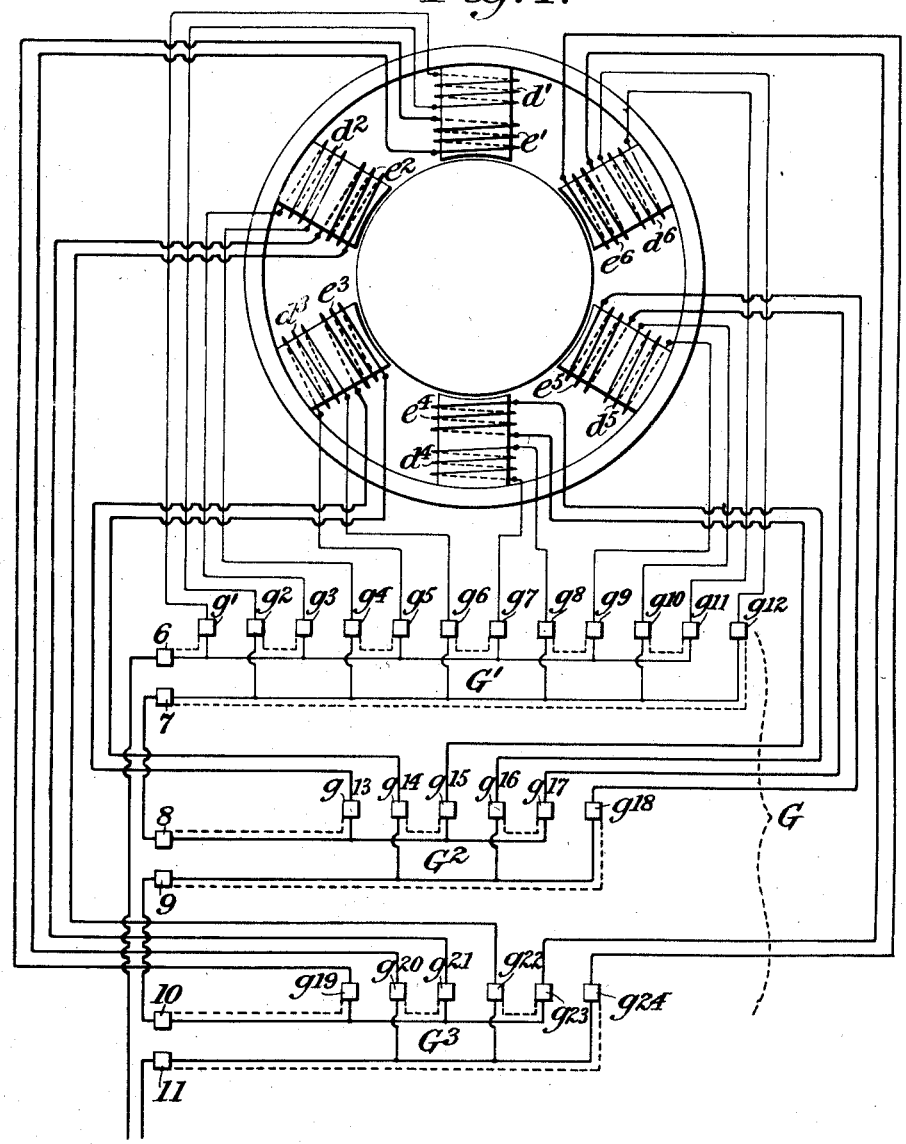

No. 815,360. PATENTED MAR. 20, 1906.
L. LYNDON.
DEVICE FOR RECHARGING THE STORAGE BATTERIES OF AUTOMOBILES.
APPLICATION FILED MAY 4, 1904. RENEWED MAR. 23, 1905.
7 SHEETS—SHEET 1.
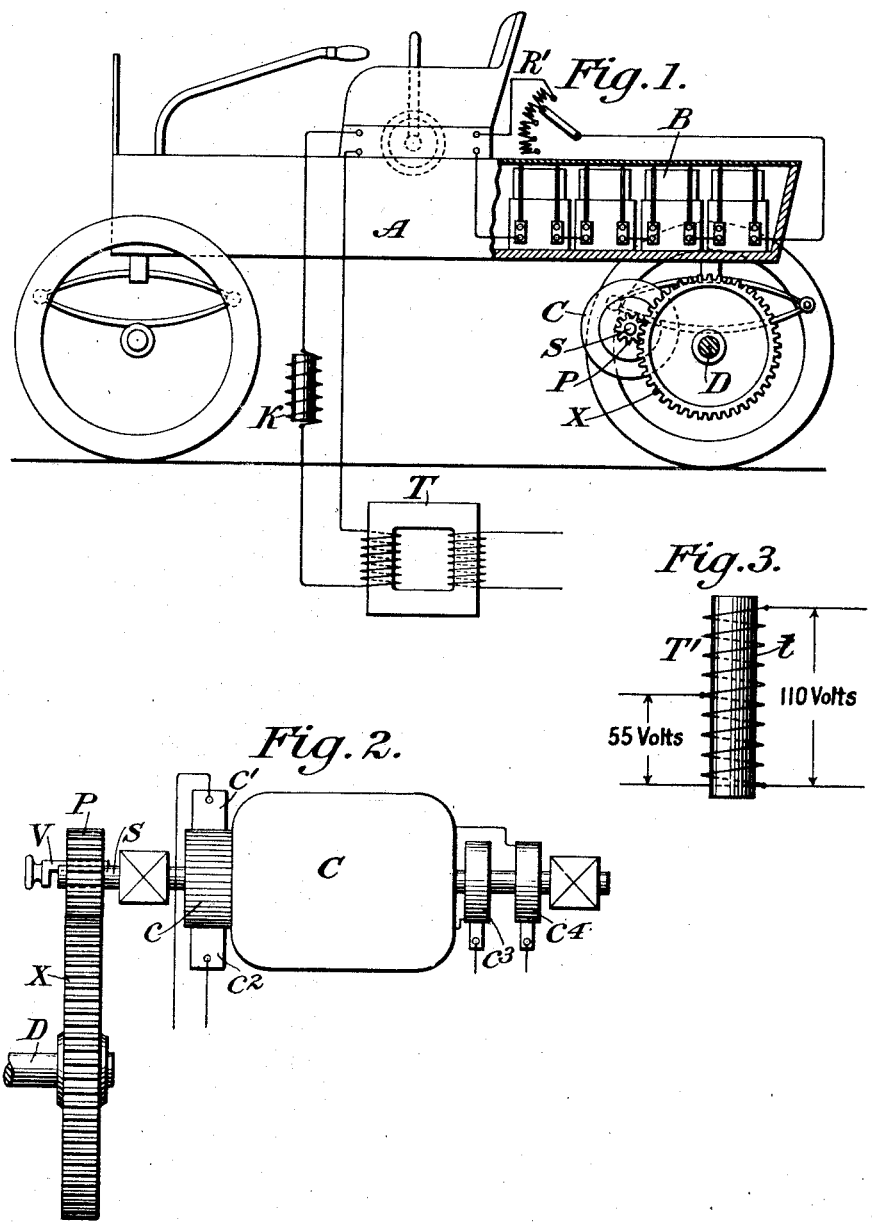
Attest:
A. N. Jesbera.
M. A. Brayley.
Inventor:
Lamar Lyndon
by Redding, Kiddle & Greeley
Attys.

No. 815,360. PATENTED MAR. 20, 1906.
L. LYNDON.
DEVICE FOR RECHARGING THE STORAGE BATTERIES OF AUTOMOBILES.
APPLICATION FILED MAY 4, 1904. RENEWED MAR. 23, 1905.

7 SHEETS—SHEET 2

Attest:
A. N. Jesbera
M. A. Brayley.

Inventor:
Lamar Lyndon
by Redding, Kiddle & Greeley
Attys.

No. 815,360. PATENTED MAR. 20, 1906.
L. LYNDON.
DEVICE FOR RECHARGING THE STORAGE BATTERIES OF AUTOMOBILES.
APPLICATION FILED MAY 4, 1904. RENEWED MAR. 23, 1905.

7 SHEETS—SHEET 3.

Attest:
A. N. Jesbera.
M. A. Brayley.

Inventor:
Lamar Lyndon
by Redding, Riddle & Greeley
Attys.

No. 815,360. PATENTED MAR. 20, 1906.
L. LYNDON.
DEVICE FOR RECHARGING THE STORAGE BATTERIES OF AUTOMOBILES.
APPLICATION FILED MAY 4, 1904. RENEWED MAR. 23, 1905.
7 SHEETS—SHEET 4.
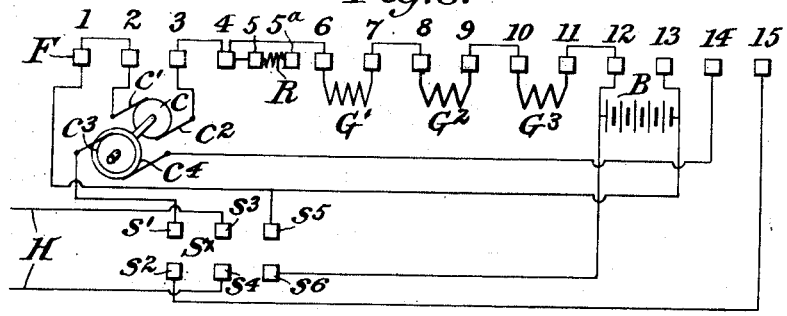
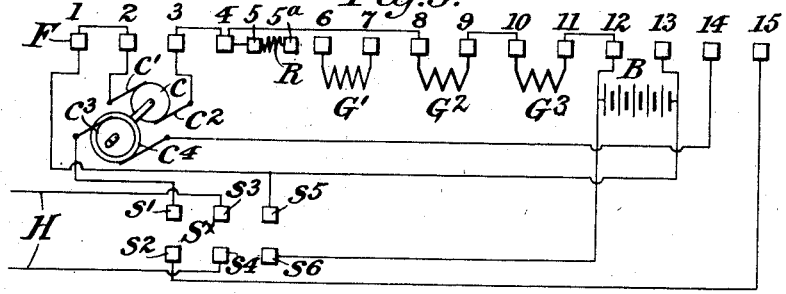
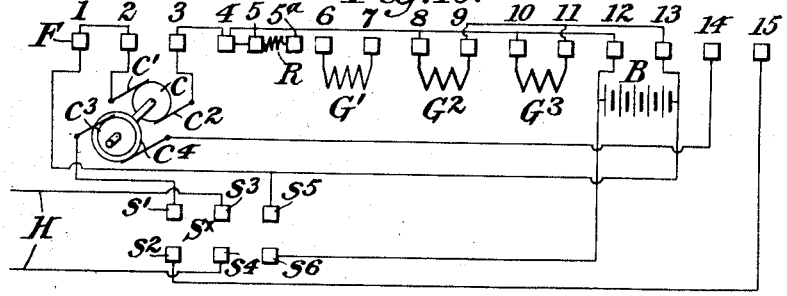
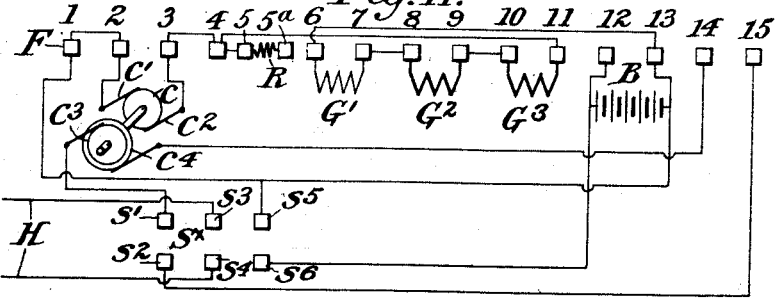
Attest:
A. N. Jesbera
M. A. Brayly
Inventor:
Lamar Lyndon
by Redding Kiddle & Greeley
Attys.

No. 815,360. PATENTED MAR. 20, 1906.
L. LYNDON.
DEVICE FOR RECHARGING THE STORAGE BATTERIES OF AUTOMOBILES.
APPLICATION FILED MAY 4, 1904. RENEWED MAR. 23, 1905.

7 SHEETS—SHEET 5.

Attest:
A. N. Jesbera
M. A. Brayley

Inventor:
Lamar Lyndon
by Redding, Kiddle & Greeley
Attys.

No. 815,360. PATENTED MAR. 20, 1906.
L. LYNDON.
DEVICE FOR RECHARGING THE STORAGE BATTERIES OF AUTOMOBILES.
APPLICATION FILED MAY 4, 1904. RENEWED MAR. 23, 1905.

No. 815,360. PATENTED MAR. 20, 1906.
L. LYNDON.
DEVICE FOR RECHARGING THE STORAGE BATTERIES OF AUTOMOBILES.
APPLICATION FILED MAY 4, 1904. RENEWED MAR. 23, 1905.

7 SHEETS—SHEET 7.

Witnesses:
Chas. D. King
A. N. Jesbera

Inventor:
Lamar Lyndon
by Redding, Kiddle & Greeley
Attys.

UNITED STATES PATENT OFFICE.

LAMAR LYNDON, OF NEW YORK, N. Y.

DEVICE FOR RECHARGING THE STORAGE BATTERIES OF AUTOMOBILES.

No. 815,360.  Specification of Letters Patent.  Patented March 20, 1906.

Application filed May 4, 1904. Renewed March 23, 1905. Serial No. 251,596.

*To all whom it may concern:*

Be it known that I, LAMAR LYNDON, a citizen of the United States, residing in the borough of Manhattan, city of New York, in the State of New York, have invented certain new and useful Improvements in Devices for Recharging the Storage Batteries of Automobiles, &c., of which the following is a specification, reference being had to the accompanying drawings, forming a part hereof.

In the practical operation of motor-vehicles propelled by electric motors which receive their energy from storage batteries carried by the vehicles themselves much difficulty is often experienced in obtaining the electric current necessary for the recharging of the battery, particularly in view of the fact that the electric current is now commonly distributed as alternating current, whereas direct current is required for the recharging. Transforming-stations exist; but it is not always convenient or even possible to reach such a transforming-station when the necessity for recharging arises. The installation of a special transforming plant for an individual operator is somewhat expensive and is not always practicable. Moreover, in the case of a single-phase rotary converter, which is a satisfactory form, since there is no rotary magnetic field to cause the armature to start from a condition of rest, special means must be provided for bringing the armature up to synchronous speed. Obviously it would be of great advantage in the operation of every automobile to have the automobile itself equipped with means for the converting of the current, especially if such means do not add greatly to the weight of the vehicle or to the expense of construction thereof.

It is the object of this invention to provide such means, so that it will always be possible to recharge the batteries at any point where it is possible to secure a supply of alternating current. To attain this object, provision is made whereby the driving-motor of the electrically-propelled vehicle can be utilized as a rotary converter, the motor being so arranged that when used for such purpose its energy shall not be expended in the propulsion of the vehicle, and suitable collecting devices, switches, and voltage-controlling means being provided whereby alternating current can be supplied from any convenient source and be rectified by the motor then operating as a converter and delivered to the battery, it being also possible, if desired, to provide for the bringing of the motor up to synchronous speed by current supplied from the battery before it is attempted to recharge the battery from the source of alternating current. It will be understood that the armature may be brought up to a speed equal to or above synchronism by any suitable means, whether by the battery itself or by hand-operated devices. When it has been so brought up to speed, the circuit from the armature to the battery is opened and the circuit from the collecting-rings carried by the armature to the sources of alternating current is closed, and if the speed of rotation of the armature is then above that of synchronism it will decrease until the speed of synchronism is reached and will then continue to rotate synchronously. At such time the direct current may be taken from the brushes of the ordinary commutator and delivered to the battery for recharging the same. During the operation of the motor as a rotary converter in this manner the driving-wheels of the vehicle may be raised from the ground to rotate freely or the motor may be disconnected from the driving-wheels by any convenient mechanical device. The rate of current-flow from the source of alternating current through the motor operating as a rectifier or converter to the battery must of course be regulated, and since the voltage and the current-flow at the direct-current brushes of the motor are proportional to the voltage and current-flow at the alternating-current brushes or collector-rings such regulation may be effected in any one of the several different ways, as by a resistance in the direct-current circuit, a resistance in the alternating-current circuit, an ordinary transformer in the alternating-current circuit, a choking-coil in the alternating-current circuit, or a rheostat either in the direct or the alternating current circuit. This regulating device may be made a part of the vehicle or may be located at a fixed point at which the charging is to be effected, as may be preferred.

The invention will be described in detail and will be explained more fully hereinafter with reference to the accompanying drawings, in which—

Figure 15:
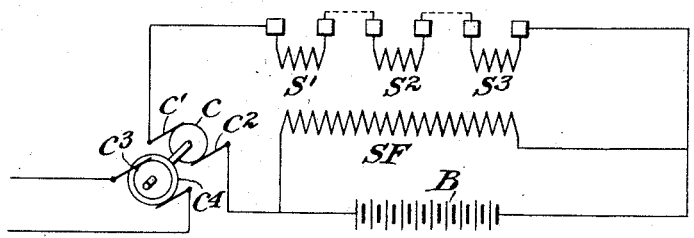
Figure 16:
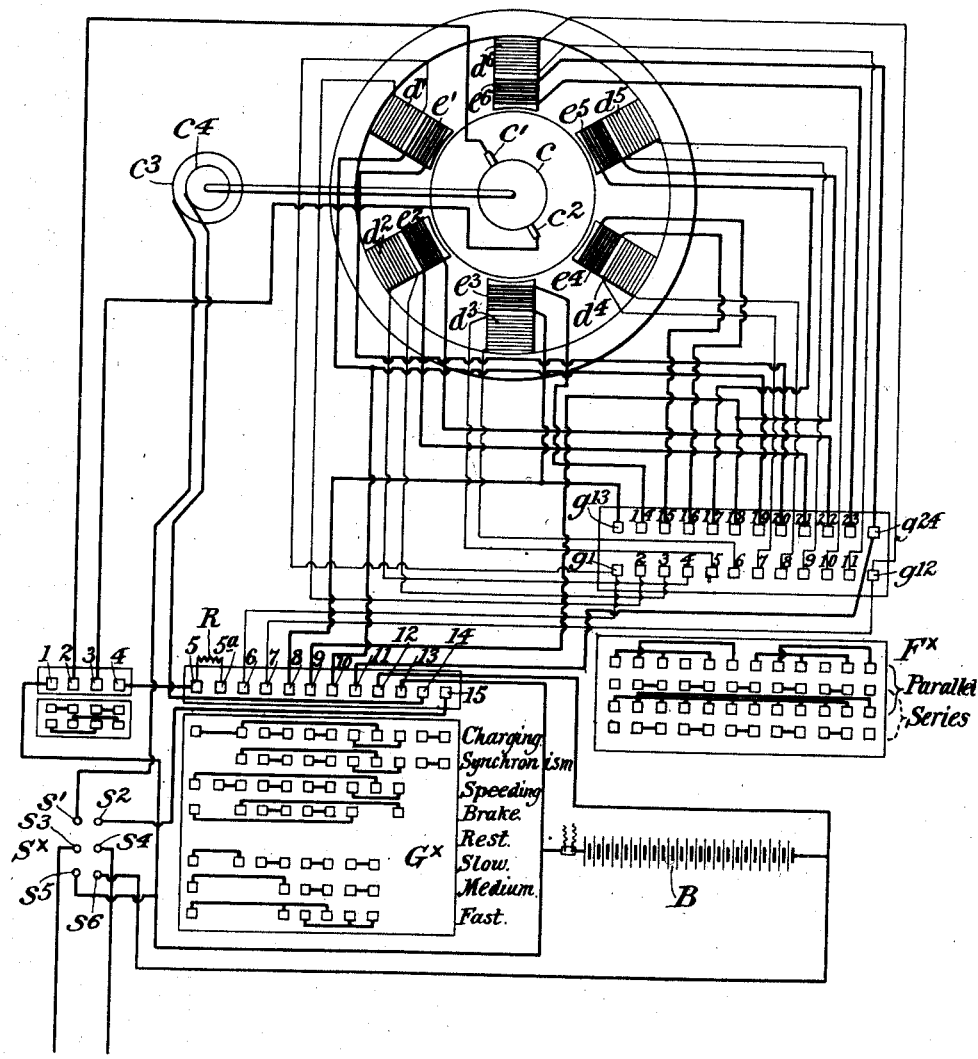
Figure 17:
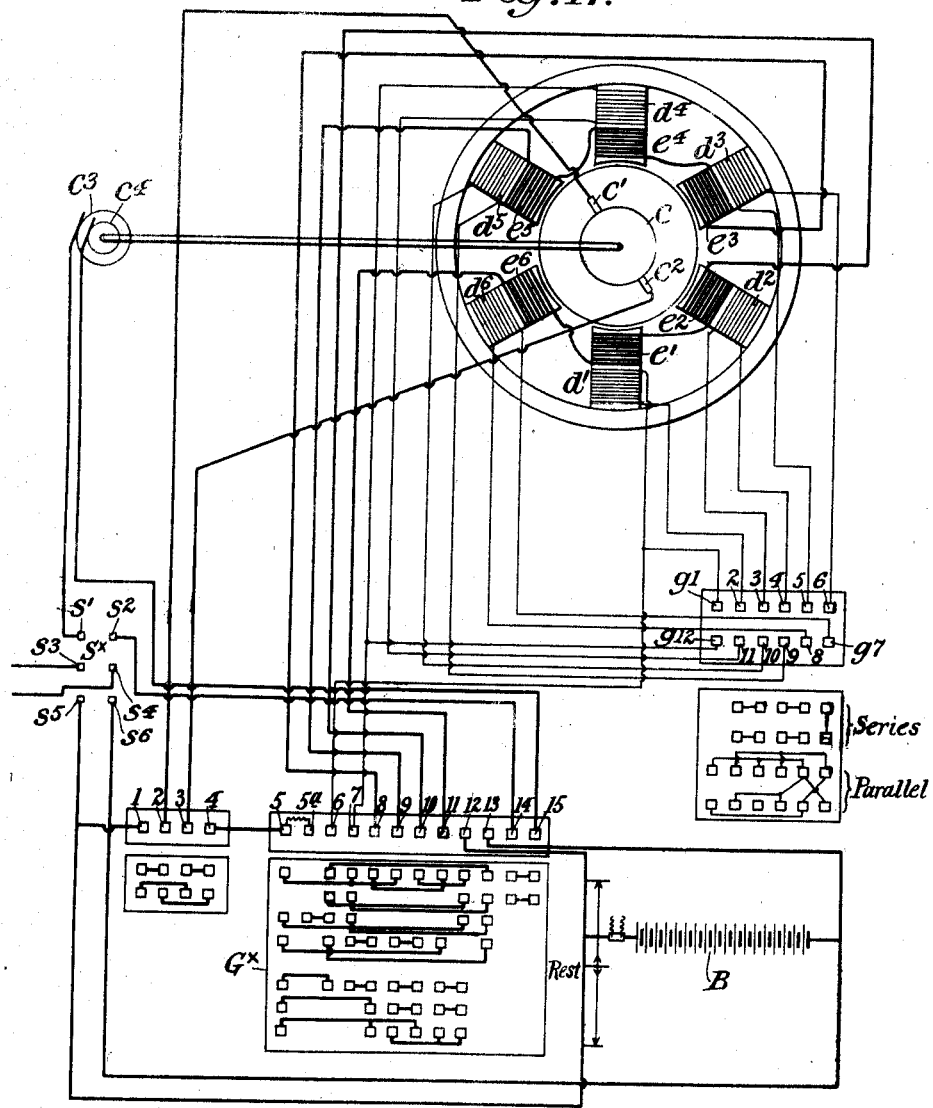

Figure 1 is a view in elevation of a motor-vehicle of ordinary type to which the present invention may be applied. Fig. 2 is a detail view of the motor, illustrating one form of means for permitting the rotation of the motor as a converter in recharging. Fig. 3 is a diagrammatic view of one form of voltage-controlling means. Fig. 4 is a diagrammatic view illustrating the windings of the motor and the connections thereof with the points of the auxiliary controller and thence the points of the main controller. Figs. 5 to 14 are diagrammatic views representing the different connections of the motor under different conditions. Fig. 15 is a diagrammatic view representing a different winding of the motor from that represented in Fig. 4. Fig. 16 is a view generally similar to Fig. 4, but showing the movable contacts of the controllers in relation to the fixed contacts or terminals thereof. Fig. 17 is a view similar to Fig. 16, but illustrating the modification of the winding of the motor indicated in Fig. 15.

In the embodiment of the invention illustrated in the drawings so much of an automobile of ordinary type is represented in Fig. 1 as is necessary to enable the application of the invention to be understood. The body A of such vehicle may be arranged to receive and support the storage battery (indicated at B) in any usual or suitable manner, while the motor C is also mounted as may be preferred and is suitably connected with the driving-axle or driving-wheels, the armature-shaft S in the present instance being shown as provided with a pinion P, which engages a gear X on the drive shaft or axle D. As hereinbefore suggested, it is necessary to provide means whereby when the battery is being recharged with the motor operating as a rotary converter the energy of rotation of the motor shall not be expended in the propulsion of the vehicle. Obviously this might be accomplished by raising the drive-wheels of the vehicle from the floor or by disconnecting the transmitting-gearing at any point between the motor and the drive-wheels. As represented in the drawings, the pinion P is secured thereon for rotation by a sliding key or feather V, which is represented as having a knob or handle by which it can be readily pulled out or replaced, as may be desired.

Figure 5:
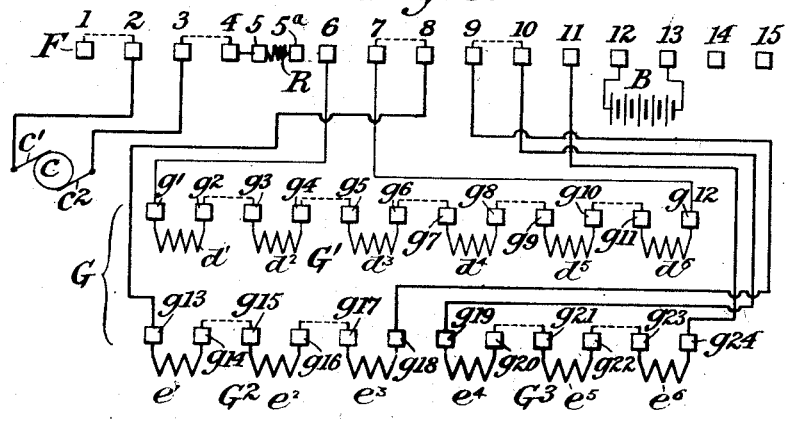
Figure 6:
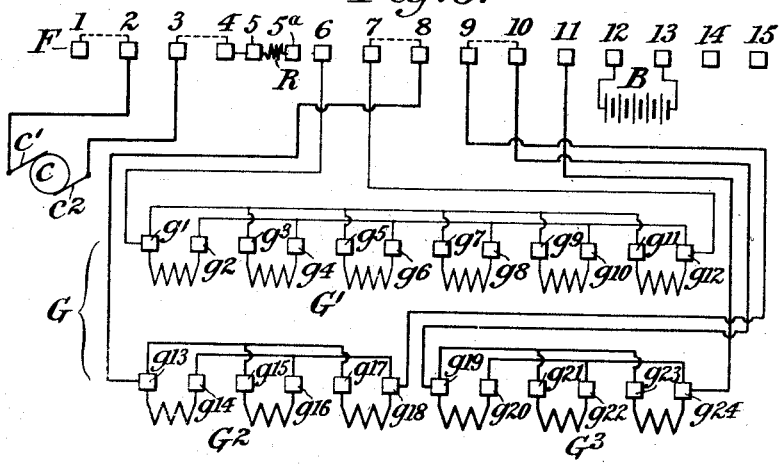

The motor is provided with the usual commutator $c$, with its direct-current brushes $c'$ and $c^2$, and is generally constructed and arranged as usual, except that the armature or armature-shaft is provided with collecting-rings $c^3$ and $c^4$, which are respectively connected with the armature-windings, and that there is a plurality of field-windings, which may be thrown into parallel or parallel groups to give a sufficiently low resistance and a sufficiently high magnetizing power to enable the machine to work satisfactorily as a series driving-motor at different speeds and into series to give a sufficiently high resistance to enable the machine to work satisfactorily as a shunt-wound rotary converter. As shown in Fig. 4, there may be two coils on each pole, as $d'\ d^2\ d^3$, &c., and $e'\ e^2\ e^3$, &c., the several coils $d'\ d^2$, &c., being of compara-tively small wire to offer a comparatively high resistance, while the coils $e'\ e^2$, &c., may be of coarser wire to have a comparatively low resistance. As shown in Figs. 4, 5, and 6, the several coils $d'\ d^2$, &c., are connected to the points $g'\ g^2$, &c., of a group $G'$ of points of a suitable auxiliary controller, (indicated generally at G,) the coils $e^3, e^4$, and $e^5$ to the points $g^{13}\ g^{14}$, &c., of a group $G^2$ of points of such auxiliary controller, and the coils $e'$ and $e^2$ and $e^6$ to the points $g^{19}\ g^{20}$, &c., of a group $G^3$ of such contacts, the auxiliary controller being provided with twenty-four points or contacts for a six-pole motor having two coils to each pole. The several coils of each group may thus be connected in series, as shown in Fig. 5, to have a comparatively high resistance, or in parallel, as shown in Fig. 6, to have a comparatively low resistance. Connections are also provided, as also shown in Figs. 5 and 6, from the auxiliary controller G to the points or contacts 6, 7, 8, 9, 10, and 11 of the main controller F, whereby the several groups may be connected in series, as shown in Figs. 5 and 6, or two groups $G^2$ and $G^3$ may be connected in series, with the group $G'$ cut out, or the groups $G^2$ and $G^3$ may be connected in parallel, with the group $G'$ cut out, or the several groups may be connected in parallel.

The controller F is of ordinary construction and is sufficiently illustrated with its connections, in Figs. 7 to 14, in which different positions are represented, the several groups of field-coils being represented by single coils to avoid unnecessary complication of the drawings. Four contacts (marked 1, 2, 3, and 4, respectively) may be provided for connection to the brushes $c'$ and $c^2$ of the motor to afford convenience in the reversal of the motor, if desired; but in the following description these will be regarded as connected for rotation of the motor in one direction only. Contact 4 is permanently connected to contact 5. Between the contacts 5 and $5^a$ is connected a resistance R, for a purpose to be referred to hereinafter. The contacts 6, 7, 8, 9, 10, and 11 are connected with the several groups $G'$, $G^2$, and $G^3$ of the field-coils through the auxiliary controller G, as already stated. The contacts 12 and 13 are connected with the terminals of the battery B and with the charging-plug through a double-throw switch $S^\times$, as hereinafter described. The contact 14 is connected with one of the collecting or slip rings $c^3$ and $c^4$ of the motor and the contact 15 with one of the points of the switch $S^\times$. It will be understood that each of the controllers employed is of the ordinary and well-known construction and arrangement adapted for the purpose of shifting the connections of the motor for recharging the battery, or for propelling the motor at different speeds, or for bringing the motor up to synchronous speed, and that they may be located at any convenient point. The connections to be effected for the purpose of securing the various results desired will be referred to hereinafter. The switch $S^\times$ is provided with three pairs of contacts, the contacts $s'$ and $s^2$ being connected, respectively, with the slip-ring $c^3$ and the contact 15 of the controller F, the contacts $s^3$ and $s^4$ with the terminals of the charging-plug H, the contact $s^5$ with contact 1 of the controller F, the one terminal of the battery B, and the contact 13, and the contact $s^6$ with the other terminal of the battery and contact 12.

Figure 7:
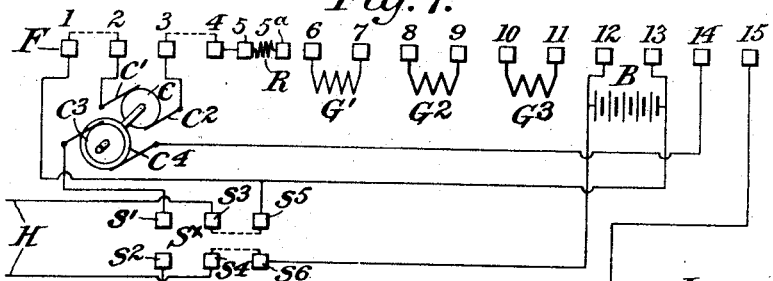
Figure 12:
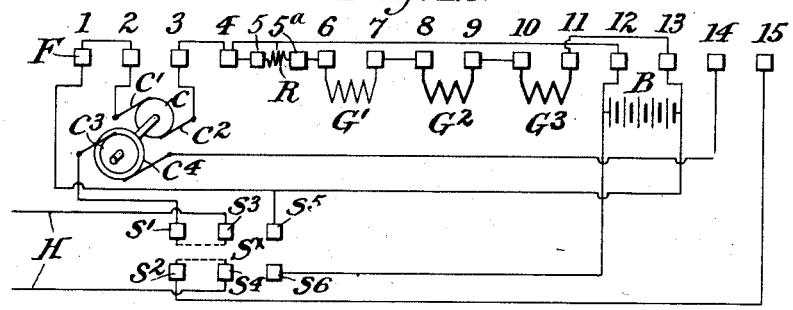

When the motor is at rest, all of the field-coils are in parallel and all contacts of the main controller are open. If under these conditions it is desired to charge the battery with direct current, the switch $S^\times$ is thrown to connect the terminals of the charging-plug with the terminals of the battery, as shown in Fig. 7.

For the purpose of driving the motor in propelling the carriage at its first or lowest speed the several coils of each group of field-coils are connected in parallel and the three groups are connected in series with the armature and the battery, as shown in Fig. 8. Under these conditions the motor runs as a series motor with a strong field, which gives a strong starting torque, a low starting armature-current, and a slow speed, the two latter effects being due both to the strong field and to the fact that the resistance of the group made up of the higher resistance-coils cuts down the voltage at the armature-terminals, acting, in fact, as a starting resistance as well as a field-winding. The controller connections for the second or intermediate speed are shown in Fig. 9, in which the several coils of the groups $G^2$ and $G^3$ of the field-coils being in parallel, as before, the group $G'$ is cut out and the groups $G^2$ and $G^3$ are in series. As compared with the last-described connections, the speed of the motor is increased because of the weakened field and the reduced resistance in circuit. For the third or fastest speed the connections are shown in Fig. 10. The coils of groups $G^2$ and $G^3$ being connected in parallel, the two groups are themselves connected in parallel and group $G'$ is cut out.

In Fig. 11 are shown the connections which permit the motor to be used as an electric brake. The several groups of field-coils are connected in series with the armature and the battery; but the connections between the field-coils and the battery are reversed, so as to send current through the coils in a direction opposite to that indicated in Fig. 8.

Figure 13:
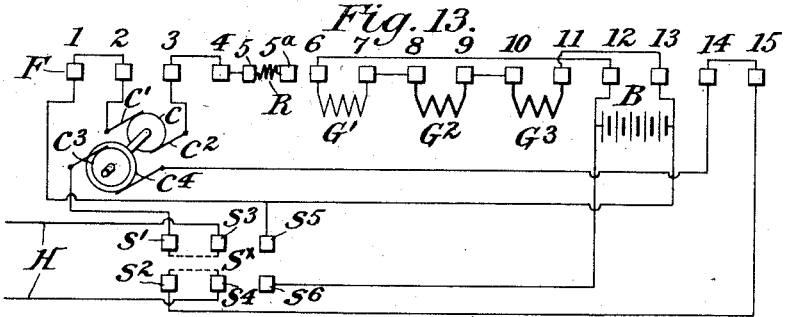
Figure 14:
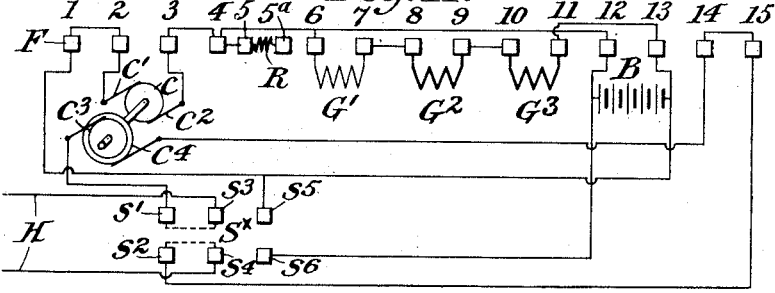

In preparing for the use of a motor as a rotary converter after the wheels of the vehicle have been lifted from the ground or the driving mechanism has been disconnected it is necessary to bring the motor up to or above the speed of synchronism. Obviously this can be effected by any convenient means—such, for example, as a hand-operated gear; but the battery itself may be employed for the purpose. The connections for this purpose (represented in Fig. 12) are as follows: All coils of the several groups of field-coils being connected in series, the groups themselves are connected in series with each other and with the resistance R (to further decrease the field-current) in shunt with the armature. Under these conditions the motor rotates, running as a shunt-motor without load, and quickly attains a high velocity. When the desired velocity has been attained, the alternating-current main being plugged in at H, the switch $S^\times$ is shifted to establish connection from $s^3$ to $s'$ and from $s^4$ to $s^2$, and the controller F is further shifted to open the armature-circuit to cut out the resistance R and to make connection from 14 to 15, as shown in Fig. 13. This throws alternating current on the collecting-rings $c^3$ and $c^4$, and the motor falls into step, running in synchronism and with strong external field excitation. A further shifting of the controller F closes the armature-circuit, and the other connections remaining as before alternating current flows into the armature through the collecting-rings $c^3$ and $c^4$ and is delivered to be rectified or converted, a portion being then passed through the field-coils in the proper direction—that is, in the same direction as that in which the current flows through the fields when the motor is operating to propel the vehicle—and a portion going to the battery, which is recharged thereby. The delivery of current to the battery may be varied by a suitable rheostat, (indicated at R',) which may be located at any convenient point, as between the switch and the battery, or by an ordinary choking-coil K, which may likewise be located at any convenient point, either on the vehicle or at the charging-station, or by both of such devices. The usual step-down transformer T, as shown in Fig. 1, may be employed to so regulate the voltage of the entering current that the desired voltage at the collecting-rings may be attained, or an autotransformer T', such as that shown in Fig. 3, may be employed for the purpose, such autotransformer comprising an iron core $t$, which is wound with a number of turns of wire of the required size, the terminals of the winding being connected to the alternating-current mains, respectively. The connections to the controller are taken off at an intermediate point as to one of them, and the ratio of the voltage in the mains on opposite sides of this autotransformer will be equal to the ratio between the number of turns respectively included. In each case, therefore, the connections to the transformer will be so made as to yield the desired voltage in the current supplied.

It is understood that one or more of the several regulating devices may be employed in each instance, as most convenient.

When the apparatus commences operation as a converter, it is possible that the polarity at the direct-current brushes $c'$ and $c^2$ may be reversed. This will be indicated at the voltmeter, and thereupon the connections through contacts 1, 2, 3, and 4 of the controller F should be shifted so that the connections shall be from the positive pole of the machine to the positive pole of the battery.

In order to avoid confusion, the movable contacts of the controllers F and G have not been referred to heretofore, nor are they shown in Fig. 4 of the drawings. In Fig. 16, however, the movable contacts of the main controller are indicated generally at $F^\times$, and the movable contacts of the auxiliary controller are similarly represented at $G^\times$. The arrangement of the movable contacts of each of these controllers will be readily understood upon reference to Fig. 16 and need not be described in detail herein. It will be sufficient to state that when the first and third rows of contacts of the movable portion of the auxiliary controller are over the corresponding sets of fixed contacts all of the six shunt-coils of the motor are in parallel on the lower row, and the series coils are grouped into two sets of three coils each, the coils in each set being in parallel, and when the second and fourth rows of the contacts of the movable portion are over the corresponding rows of fixed contacts the coils are connected in series. When the open space on the moving portion of the main controller is over the row of fixed contacts thereof, the battery-circuit and the motor-circuit are open and the vehicle is at rest. A forward movement of the controller from its initial position gives successively the lowest speed, the intermediate speed, and the highest speed. A reverse movement of the controller from its initial position gives first the braking effect, then a speed above synchronism, then synchronous speed, and finally the operation of the motor as a rotary converter while charging the battery from a source of alternating current.

A series motor or dynamo-electric machine has been particularly referred to thus far, since a motor of this type is generally used for the propulsion of vehicles; but it will be obvious that the improvement is equally applicable to a shunt or compound-wound motor, the shunt-coils receiving current from either the battery or the commutator. Such an arrangement is represented in Figs. 15 and 17, in which the shunt-field is shown at SF and the several groups of series field-windings at $S'$, $S^2$, and $S^3$. A detailed description of this arrangement will be unnecessary in view of the particular description of the arrangement first referred to, and it will be understood that for the first speed of the motor the group $S'$, $S^2$, and $S^3$ are in series. For the next speed the group $S^2$ and $S^3$ are in series, with the group $S'$ cut out. For the third speed the group $S^2$ and $S^3$ are in parallel, and for the fourth speed the group $S'$, $S^2$, and $S^3$ may be cut out altogether, the shunt-field of course remaining in circuit in each instance. When the machine is operating as a rotary converter, the connections are the same as for the first motor-speed just referred to. The shunt-field magnetization is low enough to bring the speed up to or above synchronism, and as the group $S'$ comprises numerous turns its effect, together with that of the group $S^2$ and $S^3$, gives a strong magnetization with passage of current to the battery. The relation between the contacts of the moving portion of the main and auxiliary controllers to the fixed contacts of such controllers in this embodiment of the invention will be readily understood upon examination of Fig. 17 without detailed explanation herein.

Other modifications of the general features of the device will suggest themselves to those skilled in the art, and it is to be understood that the invention is not restricted to the particular arrangements shown and described herein.

I claim as my invention—

1. In an electrically-propelled motor road-vehicle, the combination of a dynamo-electrical machine mounted on the vehicle and having a commutator and independent collecting devices, a storage battery adapted to furnish the total propelling-current also mounted on the vehicle, and connections whereby at will current may be supplied from said battery to said machine to operate the same, or alternating current may be delivered to said machine through said current-collecting devices when the vehicle is at rest and being there rectified and changed to direct current at the commutator be supplied from said machine to the battery to recharge the same, substantially as shown and described.

2. In an electrically-propelled motor road-vehicle, the combination of a dynamo-electrical machine mounted on the vehicle and having a commutator, and independent current-collecting devices, a storage-battery adapted to furnish the total propelling-current also mounted on the vehicle, and connections whereby at will current may be supplied from said battery to said machine to operate the same for propelling the vehicle, or from said battery to said machine to operate the same without load, or alternating current may be supplied to said machine through said current-collecting devices when the vehicle is at rest and being there rectified and changed to direct current at the commutator be supplied from said machine to the battery to recharge the same, substantially as shown and described.

3. In an electrically-propelled vehicle, the combination of a dynamo-electric machine mounted on the vehicle and having a commutator and current-collecting devices, driving connections between the same and the drive-wheels of the vehicle, means to disconnect said driving connections, a storage battery also mounted on the vehicle, and connections whereby at will current may be supplied from said battery to said machine to operate the same, or alternating current may be delivered to said machine through said current-collecting devices and being there rectified and changed to direct current at the commutator be supplied from said machine to the battery to recharge the same, substantially as shown and described.

4. In an electrically-propelled motor road-vehicle, the combination of a dynamo-electrical machine mounted on the vehicle and having a commutator and independent current-collecting devices, a storage battery adapted to furnish the total propelling-current also mounted on the vehicle, connections whereby at will current may be supplied from said battery to said machine to operate the same, or alternating current may be delivered to said machine through said current-collecting devices when the vehicle is at rest and being there rectified and changed to direct current at the commutator be supplied from said machine to the battery to recharge the same, and a resistance included in the circuit to regulate the current delivered to the battery, substantially as shown and described.

5. In an electrically-propelled vehicle, the combination of a dynamo-electric machine mounted on the vehicle and having a commutator and current-collecting devices, driving connections between the same and the drive-wheels of the vehicle, means to disconnect said driving connections, a storage battery also mounted on the vehicle, connections whereby at will current may be supplied from said battery to said machine to operate the same, or alternating current may be delivered to said machine through said current-collecting devices and being there rectified and changed to direct current at the commutator be supplied from said machine to the battery to recharge the same, and a resistance included in the circuit to regulate the current delivered to the battery, substantially as shown and described.

6. In an electrically-propelled motor road-vehicle, the combination of a dynamo-electric machine mounted on the vehicle, and having a commutator and independent current-collecting devices, a storage battery adapted to furnish the total propelling-current also mounted on the vehicle, connections whereby at will current may be supplied from said battery to said machine to operate the same, or alternating current may be delivered to said machine through said current-collecting devices when the vehicle is at rest and being there rectified and changed to direct current at the commutator be supplied from said machine to the battery to recharge the same, and a step-down transformer included in the alternating-current circuit to regulate the voltage of the current delivered to the apparatus, substantially as shown and described.

7. In an electrically-propelled vehicle, the combination of a dynamo-electric machine mounted on the vehicle and having a commutator and current-collecting devices, driving connections between the same and the drive-wheels of the vehicle, means to disconnect said driving connections, a storage battery also mounted on the vehicle, connections whereby at will current may be supplied from said battery to said machine to operate the same, or alternating current may be delivered to said machine through said current-collecting devices and being there rectified and changed to direct current at the commutator be supplied from said machine, to the battery to recharge the same, and a step-down transformer included in the alternating-current circuit to regulate the voltage of the current delivered to the apparatus, substantially as shown and described.

8. In an electrically-propelled motor road-vehicle, the combination of a dynamo-electric machine mounted on the vehicle and having a commutator and independent current-collecting devices, a storage battery adapted to furnish the total propelling-current also mounted on the vehicle, connections whereby at will current may be supplied from said battery to said machine to operate the same, or alternating current may be delivered to said machine through said current-collecting devices when the vehicle is at rest and being there rectified and changed to direct current at the commutator be supplied from said machine to the battery to recharge the same, and a step-down transformer included in the alternating-current circuit to regulate the voltage of the current delivered to the apparatus, said transformer comprising an iron core and a winding thereon, said winding being connected at its terminals with the supply-mains and at intermediate points with the delivery-mains, substantially as shown and described.

9. In an electrically-propelled motor road-vehicle, the combination of a series motor mounted on the vehicle and having independent current-collecting devices in addition to the commutator, a storage battery adapted to furnish the total propelling-current also mounted on the vehicle, and connections whereby at will current may be supplied from said battery to said motor to operate the same, or alternating current may be delivered to said motor through said current-collecting devices when the vehicle is at rest and being there rectified and changed to direct current at the commutator be supplied from said motor to the battery to recharge the same, substantially as shown and described.

10. In an electrically-propelled motor road-vehicle, the combination of a series motor mounted on the vehicle and having a commutator, and independent current-collecting devices, a storage battery adapted to furnish the total propelling-current also mounted on the vehicle, and connections whereby at will current may be supplied from said battery to said motor to operate the same for propelling the vehicle, or from said battery to said motor to operate the same without load, or alternating current may be supplied to said motor through said current-collecting devices when the vehicle is at rest and being thereby rectified and changed to direct current at the commutator be supplied from said motor to the battery to recharge the same, substantially as shown and described.

11. In an electrically-propelled vehicle, the combination of a series motor mounted on the vehicle and having a commutator and current-collecting devices, driving connections between the same and the drive-wheels of the vehicle, means to disconnect said driving connections, a storage battery also mounted on the vehicle, and connections whereby at will current may be supplied from said battery to said motor to operate the same, or alternating current may be delivered to said motor through said current-collecting devices and being there rectified and changed to direct current at the commutator be supplied from said motor to the battery to recharge the same, substantially as shown and described.

12. In an electrically-propelled motor road-vehicle, the combination of a series motor mounted on the vehicle and having a commutator and independent current-collecting devices, a storage battery adapted to furnish the total propelling-current also mounted on the vehicle, connections whereby at will current may be supplied from said battery to said motor to operate the same, or alternating current may be delivered to said motor through said current-collecting devices when the vehicle is at rest and being there rectified and changed to direct current at the commutator, supplied from said motor to the battery to recharge the same, and a resistance included in the circuit to regulate the current delivered to the battery, substantially as shown and described.

13. In an electrically-propelled motor road-vehicle, the combination of a series motor mounted on the vehicle and having a commutator and independent current-collecting devices, a storage battery adapted to furnish the total propelling-current also mounted on the vehicle, connections whereby at will current may be supplied from said battery to said motor to operate the same, or alternating current may be delivered to said motor through said current-collecting devices when the vehicle is at rest and being there rectified and changed to direct current at the commutator be supplied from said motor to the battery to recharge the same, and a step-down transformer included in the alternating-current circuit to regulate the voltage of the current delivered to the apparatus, substantially as shown and described.

14. In an electrically-propelled vehicle, the combination with a dynamo-electrical machine mounted on the vehicle and having a commutator and independent current-collecting devices and a plurality of groups of field-coils, a storage battery also mounted on the vehicle, and connections whereby said groups of field-coils may be thrown into parallel to give a low resistance and high magnetizing power for operation of the machine as a series driving-motor, or into series to give a high resistance to enable the machine to operate as a shunt-wound rotary converter, substantially as described.

15. In an electrically-propelled vehicle, the combination with a dynamo-electrical machine mounted on the vehicle and having a commutator and independent current-collecting devices and a plurality of groups of field-windings, a storage battery also mounted on the vehicle, an auxiliary controller and connections whereby the several coils of each of said groups of field-coils may be connected in parallel or in series, and a main controller and connections from said auxiliary controller whereby the relations of the groups of field-coils to each other and to said other devices may be changed, substantially as described.

16. In an electrically-propelled vehicle, the combination with a dynamo-electrical machine mounted on the vehicle and having a commutator and independent current-controlling devices and a plurality of groups of field-coils, a storage battery also mounted on the vehicle, connections whereby said groups of field-coils may be thrown into parallel for operation of the machine as a series driving-motor or into series for operation of the machine as a shunt-wound rotary converter, a charging-plug, and a switch and connections whereby alternating current may be delivered to the machine when operating as a shunt-wound rotary converter, substantially as described.

This specification signed and witnessed this 28th day of April, A. D. 1904.

LAMAR LYNDON.

In presence of—
ANTHONY N. JESBERA,
M. A. BRAYLEY.